United States Patent [19]

Swindells

[11] 4,086,328

[45] Apr. 25, 1978

[54] PRODUCTION OF CHLORINE DIOXIDE FROM BUFFERED REACTION MEDIA

[75] Inventor: Richard Swindells, Caledon, Canada

[73] Assignee: Erco Industries Limited, Islington, Canada

[21] Appl. No.: 770,361

[22] Filed: Feb. 22, 1977

[30] Foreign Application Priority Data

Mar. 19, 1976 United Kingdom ............... 11124/76

[51] Int. Cl.$^2$ ......................... C01B 11/02; C01B 7/04; C01D 3/04
[52] U.S. Cl. .................................... 423/478; 423/499; 423/504
[58] Field of Search ........................ 423/478, 499, 504

[56] References Cited

U.S. PATENT DOCUMENTS

| | | | |
|---|---|---|---|
| 2,863,722 | 12/1958 | Rapson | 423/478 |
| 3,101,253 | 8/1963 | Hirschberg | 423/478 |
| 3,563,702 | 2/1971 | de Vera Partridge et al. | 423/478 |
| 3,793,439 | 2/1974 | Rapson | 423/478 |
| 3,829,557 | 8/1974 | Winfield | 423/478 |
| 3,895,100 | 7/1975 | Cowley | 423/478 |
| 3,929,974 | 12/1975 | Winfield | 423/478 |
| 3,975,506 | 8/1976 | Cowley | 423/478 |

FOREIGN PATENT DOCUMENTS

| | | | |
|---|---|---|---|
| 913,328 | 10/1972 | Canada | 423/478 |

OTHER PUBLICATIONS

Hackh's Chem. Dictionary, 4th Ed. Revised, 1969, p. 114, The McGraw-Hill Book Co., N. Y.

*Primary Examiner*—Edward Stern
*Attorney, Agent, or Firm*—Sim & McBurney

[57] ABSTRACT

Chlorine dioxide is produced in a continuous process by reaction of sodium chlorate and hydrochloric acid. The reaction medium is maintained at its boiling point under subatmospheric pressure and the resulting steam is used to dilute the chlorine dioxide and chlorine and remove the same from the reaction zone. Sodium chloride is deposited from the reaction medium in the reaction zone. The reaction medium also contains buffering anions and the actual hydrogen ion concentration of the reaction medium is maintained in the range of about 0.05 to 0.3 normal to maintain an economic production rate for the chlorine dioxide.

4 Claims, No Drawings

PRODUCTION OF CHLORINE DIOXIDE FROM BUFFERED REACTION MEDIA

FIELD OF INVENTION

This invention relates to the formation of chlorine dioxide.

BACKGROUND TO THE INVENTION

It is known from Canadian Pat. No. 913,328 to provide a method of producing chlorine dioxide which comprises:

a. establishing in a reaction zone an aqueous reaction medium containing dissolved quantities of sodium chlorate, sodium chloride and hydrochloric acid, the aqueous reaction medium being substantially saturated with sodium chloride, b. continuously feeding hydrochloric acid or hydrogen chloride to the aqueous reaction medium, c. continuously maintaining the reaction medium at its boiling point at the absolute pressure thereon at a temperature below that above which substantial decomposition of chlorine dioxide occurs, d. continuously maintaining the reaction zone under a subatmospheric pressure sufficient to maintain the reaction medium at its boiling point, e. continuously generating chlorine dioxide, chlorine and sodium chloride in the reaction medium, f. continuously removing from the reaction zone a gaseous mixture of chlorine dioxide, chlorine and steam wherein the volume ratio of steam to chlorine dioxide is greater that that below which substantial decomposition of chlorine dioxide occurs, g. continuously depositing the generated sodium chloride from the reaction medium in the reaction zone, h. removing the deposited sodium chloride from the reaction zone, and i. continuously maintaining the volume of liquid in the reaction zone substantially constant.

The acidity of the reaction medium as provided by the hydrochloric acid is generally about 0.1 normal and this results in a satisfactory rate of chlorine dioxide production.

SUMMARY OF INVENTION

It has been surprisingly found that in the presence of increasing concentrations of anions of multibasic acids the rate of production of chlorine dioxide falls. In accordance with the present invention, the rate of production of chlorine dioxide from aqueous media containing anions of multibasic acids may be maintained by controlling the actual hydrogen ion concentration in the range of about 0.05 to about 0.3 normal.

GENERAL DESCRIPTION OF INVENTION

The feed of hydrochloric acid or hydrogen chloride to the reaction medium imparts to the reaction medium a certain "acidity" which remains substantially constant. The term "acidity" has a number of possible interpretations but its usual meaning is the total acidity present as determined by titration with a solution of a known concentration of sodium hydroxide to a preselected pH end point. This determination of acidity is expressed in terms of normality, i.e., the equivalent number of gram atoms of hydrogen ion per litre of solution corresponding to the value titrated. Acidity determined in this manner is referred to herein as "total acid normality".

In aqueous systems in which anions of multibasic acid are present the total acidity expressed in terms of the normality of hydrogen ions present equivalent to the value titrated does not represent the concentration of hydrogen ions available for reaction, due to the formation of anionic species containing "bound hydrogen ions" and hence a buffering of the reaction medium. The concentration of hydrogen ions available for reaction is referred to herein as the "actual hydrogen ion concentration".

The bound hydrogen ions, although not present in the solution as dissociated or actual hydrogen ions, will be included in the calculated normality derived from the value titrated in the determination of the total acidity.

The total acid normality, therefore, is not necessarily a true measure of the "actual hydrogen ion concentration", i.e., the concentration of hydrogen ions available for reaction. The term "actual hydrogen ion concentration", as used herein, is the value determined by a pH meter calibrated on a 0.1 normal solution of hydrochloric acid based on the assumption that such a solution is 100% dissociated at this concentration. This value may be expressed as pH or in terms of the normality, i.e., the number of gram atoms of actual hydrogen ion per liter of solution corresponding to the determined pH.

It is the concentration of the actual hydrogen ions in the reaction medium which determines the rate of reaction of sodium chlorate to chlorine dioxide in accordance with the equations:

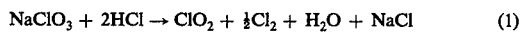

$$NaClO_3 + 2HCl \rightarrow ClO_2 + \tfrac{1}{2}Cl_2 + H_2O + NaCl \qquad (1)$$

$$NaClO_3 + 6HCl \rightarrow 3Cl_2 + 3H_2O + NaCl \qquad (2)$$

The efficiency of conversion of sodium chlorate to chlorine dioxide is determined by the extent to which reaction according to equation (1) predominates over reaction according to equation (2), since no chlorine dioxide is formed by the latter equation.

In the present invention, when the reaction medium contains "buffering ions", as defined below, the actual hydrogen ion concentration is maintained in the range of about 0.05 to about 0.3 normal by feeding appropriate quantities of total hydrogen ions and satisfactory chlorine dioxide production rates are obtained.

The term "buffering anion" as used herein is intended to refer to those anions which are capable of forming other anionic species with hydrogen ions but otherwise are inert to the system, the other anionic species having a small dissociation constant for the release of such hydrogen ions.

Generally such buffering ions are di- or multivalent inorganic anionic species, and typical examples include sulphate ions, phosphate ions and monohydrogen phosphate ions. The buffering ions generally are added as alkali metal salts thereof, usually sodium salts, and generally only one such species is present.

The buffering effect of sulphate, phosphate and monohydrogen phosphate ions is indicated by the following equations:

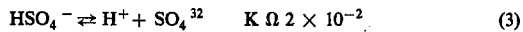

$$HSO_4^- \rightleftharpoons H^+ + SO_4^{2-} \qquad K \simeq 2 \times 10^{-2} \qquad (3)$$

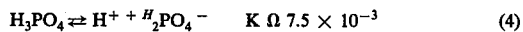

$$H_3PO_4 \rightleftharpoons H^+ + H_2PO_4^- \qquad K \simeq 7.5 \times 10^{-3} \qquad (4)$$

$$H_2PO_4^- \rightleftharpoons HPO_4^{2-} + H^+ \qquad K \simeq 7 \times 10^{-8} \qquad (5)$$

The addition of sodium sulphate to the chlorine dioxide system may be considered as illustrative of this invention.

The addition of the salt providing the buffering ions may be made as an initial charge to the reaction liquor in a quantity below its saturation concentration in the reaction medium. Once the salt is dissolved in the reaction medium, little or no further addition, continuous or intermittent, is required to maintain the concentration, as the salt does not precipitate, nor is otherwise removed from the reaction medium, except in minor amounts.

It is known from Canadian Pat. No. 969,735 to improve the efficiency of reduction of sodium chlorate by hydrochloric acid to chlorine dioxide by using various metallic catalysts, such as silver ions, manganese ions, arsenic ions and vanadium pentoxide. One or more of such catalyst ions may be present in the reaction medium in this invention to achieve an improved efficiency.

EXAMPLES

EXAMPLE 1

A chlorine dioxide producing system was operated in which a single-chambered chlorine dioxide generator fed with streams of sodium chlorate solution and hydrochloric acid was operated continuously under a subatmospheric pressure at the boiling point of the reaction medium. No buffering ions were present in the reaction medium and the actual hydrogen ion concentration was about 0.1 normal.

Sodium sulphate was then added to a concentration of 0.34 molar and the reaction medium became colourless indicating that production of chlorine dioxide had ceased. The actual hydrogen ion concentration was calculated to be about 0.007N.

Additional hydrochloric acid was then added to increase the actual hydrogen ion concentration to 0.053 normal and the colour returned to the solution indicating the reaction had recommenced. The total acid normality after this addition of hydrochloric acid was 0.3 normal.

EXAMPLE 2

A chlorine dioxide producing system similar to that of Example 1 was operated in the absence of buffering anions at an actual hydrogen ion concentration of 0.13 normal. Sodium sulphate was added to a concentration of 1.0 molar. As in the case of Example 1 the reaction medium became colourless indicating that production of chlorine dioxide had ceased. The actual hydrogen ion concentration at this point was calculated to be about 0.002N.

Sufficient hydrochloric acid was then added to increase the actual hydrogen ion concentration to its original concentration of 0.13 normal. The colour returned indicating that the reaction had recommenced. The total acidity after this addition of hydrochloric acid was about 1.0 normal.

SUMMARY

The present invention provides a procedure for formation of chlorine dioxide in the presence of buffering ions. Modifications are possible within the scope of the invention.

What we claim is:

1. In a method of producing chlorine dioxide, which comprises:
   a. establishing in a reaction zone an aqueous reaction medium containing dissolved quantities of sodium chlorate, sodium chloride and hydrochloric acid, said aqueous reaction medium being substantially saturated with sodium chloride,
   b. continuously feeding hydrochloric acid or hydrogen chloride to said aqueous reaction medium,
   c. continuously maintaining said reaction medium at its boiling point at the absolute pressure thereon at a temperature below that above which substantial decomposition of chlorine dioxide occurs,
   d. continuously maintaining said reaction zone under a subatmospheric pressure sufficient to maintain said reaction medium at its boiling point,
   e. continuously generating chlorine dioxide, chlorine and sodium chloride in said reaction medium,
   f. continuously removing from said reaction zone a gaseous mixture of chlorine dioxide, chlorine and steam wherein the volume ratio of steam to chlorine dioxide is greater than that below which substantial decomposition of chlorine dioxide occurs,
   g. continuously depositing said generated sodium chloride from said reaction medium in said reaction zone,
   h. removing said deposited sodium chloride from said reaction zone, and
   i. continuously maintaining the volume of liquid in said reaction zone substantially constant,
   the improvement wherein
   j. said aqueous reaction medium contains at least one buffering anion selected from the group consisting of divalent and multivalent inorganic anionic species which is introduced to said aqueous reaction medium as a water-soluble salt thereof, and
   k. the actual hydrogen ion concentration in said reaction medium is maintained in the range of about 0.05 to about 0.03 normal.

2. The method of claim 1 wherein said buffering anion is selected from sulphate ions, phosphate ions and monohydrogen phosphate ions.

3. The method of claim 1 wherein said buffering anion is present in said reaction medium by virtue of an initial charge of a water-soluble salt thereof to said reaction medium in a concentration below the saturation of the reaction medium by said salt at the prevailing reaction conditions.

4. The method of claim 1 wherein said reaction medium also contains an efficiency improving quantity of at least one catalyst selected from vanadium pentoxide, silver ions, manganese ions and arsenic ions.

* * * * *

UNITED STATES PATENT OFFICE
CERTIFICATE OF CORRECTION

Patent No. 4,086,328          Dated April 25, 1978

Inventor(s) Richard Swindells

It is certified that error appears in the above-identified patent and that said Letters Patent are hereby corrected as shown below:

Column 2, line 63, "$SO_4^{32}$" should read "$SO_4^=$"

Column 2, line 65, "$H^{++}H2PO_4^-$" should read "$H^+ + H_2PO_4^-$"

Column 4, line 46, "0.03" should read "0.3"

Signed and Sealed this

Tenth Day of October 1978

[SEAL]

Attest:

RUTH C. MASON
Attesting Officer

DONALD W. BANNER
Commissioner of Patents and Trademarks